US012808815B2

(12) United States Patent
Byers

(10) Patent No.: US 12,808,815 B2
(45) Date of Patent: Nov. 24, 2026

(54) NON-DESTRUCTIVE TESTING METHOD FOR COMPONENT INSPECTION

(71) Applicant: Pratt & Whitney Canada Corp., Longueuil (CA)

(72) Inventor: Justin Byers, Saint-Lambert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 288 days.

(21) Appl. No.: 18/430,111

(22) Filed: Feb. 1, 2024

(65) Prior Publication Data

US 2025/0251349 A1 Aug. 7, 2025

(51) Int. Cl.

*G01N 21/91* (2006.01)
*G01N 29/12* (2006.01)
*G01N 29/22* (2006.01)

(52) U.S. Cl.

CPC ............. *G01N 21/91* (2013.01); *G01N 29/12* (2013.01); *G01N 29/223* (2013.01); *G01N 2201/025* (2013.01)

(58) Field of Classification Search

CPC ...... G01N 21/91; G01N 29/12; G01N 29/223; G01N 2201/025
See application file for complete search history.

(56) References Cited

U.S. PATENT DOCUMENTS 2,259,400 A * 10/1941 Switzer .................. G01N 21/91 73/104
2,856,538 A 10/1958 Switzer
2,883,549 A 4/1959 Betz
4,968,892 A 11/1990 Mcatee
9,228,980 B2 1/2016 Singh
9,360,418 B2 6/2016 Georgeson
9,535,012 B2 * 1/2017 Satzger .............. G01N 21/6447
11,143,630 B2 * 10/2021 Jauriqui ................. G01N 29/12
2014/0060188 A1 3/2014 Singh
2015/0114121 A1 4/2015 Takahashi

FOREIGN PATENT DOCUMENTS

GB 785775 A * 11/1957 ............. G01N 29/04

OTHER PUBLICATIONS

EP Search Report for EP Patent Application No. 25155414.3 dated Nov. 11, 2025.

(Continued)

*Primary Examiner* — Jamel E Williams
(74) *Attorney, Agent, or Firm* — Getz Balich LLC

(57) ABSTRACT

A method for inspecting an aircraft propulsion system component for defects using non-destructive testing includes applying a fluorescent penetrant to one or more surfaces of a component, resonating the component with a resonance test assembly, while the fluorescent penetrant is applied to the one or more surfaces, and measuring a resonance frequency of the component with the resonance test assembly, removing excess fluorescent penetrant from the one or more surfaces subsequent to measuring the resonance frequency of the component, and illuminating the component with ultraviolet (UV) light and, while illuminating the component, identifying a presence or an absence of one or more defects at the one or more surfaces indicated by the fluorescent penetrant.

13 Claims, 4 Drawing Sheets

(56) References Cited

OTHER PUBLICATIONS

Milne "Studies Into the Vibro-Enhancement of Penetrant Inspection and the Ultrasonic Inspection of Diffusion Bonds", https://www.imperial.ac.uk/media/imperial-college/research-centres-and-groups/non-destructive-evaluation/Katherine-Milne-EngD-thesis-2010.pdf, Mar. 2010.

SAE International "Aerospace Material Specification AMS2644", https://www.sae.org/standards/content/ams2644h/, Aug. 1996.

* cited by examiner

NON-DESTRUCTIVE TESTING METHOD FOR COMPONENT INSPECTION

TECHNICAL FIELD

This disclosure relates generally to the inspection of aircraft propulsion system components using non-destructive testing techniques and, more particularly, to component inspection using resonance testing and fluorescent penetrant inspection testing.

BACKGROUND OF THE ART

Manufactured components, such as those used in aircraft propulsion systems, may be inspected using one or more non-destructive testing. Non-destructive testing refers to various techniques used to evaluate the properties of components and component materials without causing damage. Various systems and methods are known in the art for inspecting components using non-destructive testing techniques. While these known systems and methods may be suitable for their intended purposes, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a method for inspecting an aircraft propulsion system component for defects using non-destructive testing is provided. The method includes applying a fluorescent penetrant to one or more surfaces of a component, resonating the component with a resonance test assembly, while the fluorescent penetrant is applied to the one or more surfaces, and measuring a resonance frequency of the component with the resonance test assembly, removing excess fluorescent penetrant from the one or more surfaces subsequent to measuring the resonance frequency of the component, and inspecting the component by illuminating the component with ultraviolet (UV) light and, while illuminating the component, identifying a presence or an absence of one or more defects at the one or more surfaces indicated by the fluorescent penetrant.

In any of the aspects or embodiments described above and herein, the method may further include comparing the resonance frequency to a resonant frequency threshold range for the component to identify the component has passed or failed a resonance test.

In any of the aspects or embodiments described above and herein, the resonance test assembly may include a nest, one or more input transducers, and one or more output transducers. Resonating the component with the resonance test assembly may include applying a vibration to the component using the one or more input transducers with the component disposed in the nest. Measuring the resonance frequency of the component may include measuring the resonance frequency of the component using the one or more output transducers with the component disposed in the nest.

In any of the aspects or embodiments described above and herein, the method may further include installing the component in the nest subsequent to applying the fluorescent penetrant to the one or more surfaces.

In any of the aspects or embodiments described above and herein, the method may further include installing the component in the nest prior to applying the fluorescent penetrant to the one or more surfaces.

In any of the aspects or embodiments described above and herein, the method may further include cleaning the one or more surfaces prior to applying the fluorescent penetrant to the one or more surfaces.

In any of the aspects or embodiments described above and herein, removing the excess fluorescent penetrant from the one or more surfaces may include applying an emulsifier to the one or more surfaces.

In any of the aspects or embodiments described above and herein, measuring the resonance frequency of the component with the resonance test assembly may include measuring a temperature of the component and measuring the resonance frequency of the component using the measured temperature.

In any of the aspects or embodiments described above and herein, the method may further include applying a developer to the one or more surfaces subsequent to removing excess fluorescent penetrant and prior to identifying the presence or the absence of the one or more defects.

According to another aspect of the present disclosure, a method for inspecting an aircraft propulsion system component for defects using non-destructive testing is provided. The method includes applying a fluorescent penetrant to one or more surfaces of a component, installing the component, with the fluorescent penetrant applied to the one or more surfaces, into a nest of a resonance test assembly, resonating the component in the nest with one or more input transducers of the resonance test assembly, while the fluorescent penetrant is applied to the one or more surfaces, and measuring a resonance frequency of the component with one or more output transducers of the resonance test assembly, removing excess fluorescent penetrant from the one or more surfaces, and inspecting the component by illuminating the component with ultraviolet (UV) light and, while illuminating the component, identifying a presence or an absence of one or more defects at the one or more surfaces indicated by the fluorescent penetrant.

In any of the aspects or embodiments described above and herein, the method may further include comparing the resonance frequency to a resonant frequency threshold range for the component to identify the component has passed or failed a resonance test.

In any of the aspects or embodiments described above and herein, the method may further include cleaning the one or more surfaces prior to applying the fluorescent penetrant to the one or more surfaces.

In any of the aspects or embodiments described above and herein, removing the excess fluorescent penetrant from the one or more surfaces may include applying an emulsifier to the one or more surfaces.

In any of the aspects or embodiments described above and herein, measuring the resonance frequency of the component with the resonance test assembly may include measuring a temperature of the component and measuring the resonance frequency of the component using the measured temperature.

In any of the aspects or embodiments described above and herein, the one or more defects may include a crack, a fracture, a lap, or a seem of a component material of the component at the one or more surfaces.

According to another aspect of the present disclosure, a method for inspecting an aircraft propulsion system component for defects using non-destructive testing is provided.

The method includes applying a penetrant to one or more surfaces of a component, resonating the component with a resonance test assembly, while the penetrant is applied to the one or more surfaces, measuring a resonance frequency of the component with the resonance test assembly, and comparing the resonance frequency to a resonant frequency threshold range for the component to identify the component has passed or failed a resonance test, removing excess penetrant from the one or more surfaces subsequent to measuring the resonance frequency of the component, applying a developer to the one or more surfaces, and inspecting the component to identify a presence or an absence of one or more defects at the one or more surfaces indicated by the penetrant.

In any of the aspects or embodiments described above and herein, the resonance test assembly may include a nest, one or more input transducers, and one or more output transducers. Resonating the component with the resonance test assembly may include applying a vibration to the component using the one or more input transducers with the component disposed in the nest. Measuring the resonance frequency of the component may include measuring the resonance frequency of the component using the one or more output transducers with the component disposed in the nest.

In any of the aspects or embodiments described above and herein, the method may further include installing the component in the nest subsequent to applying the penetrant to the one or more surfaces.

In any of the aspects or embodiments described above and herein, the method may further include installing the component in the nest prior to applying the penetrant to the one or more surfaces.

In any of the aspects or embodiments described above and herein, removing the excess penetrant from the one or more surfaces may includes applying an emulsifier to the one or more surfaces.

The present disclosure, and all its aspects, embodiments and advantages associated therewith will become more readily apparent in view of the detailed description provided below, including the accompanying drawings.

DETAILED DESCRIPTION

Figure 1:
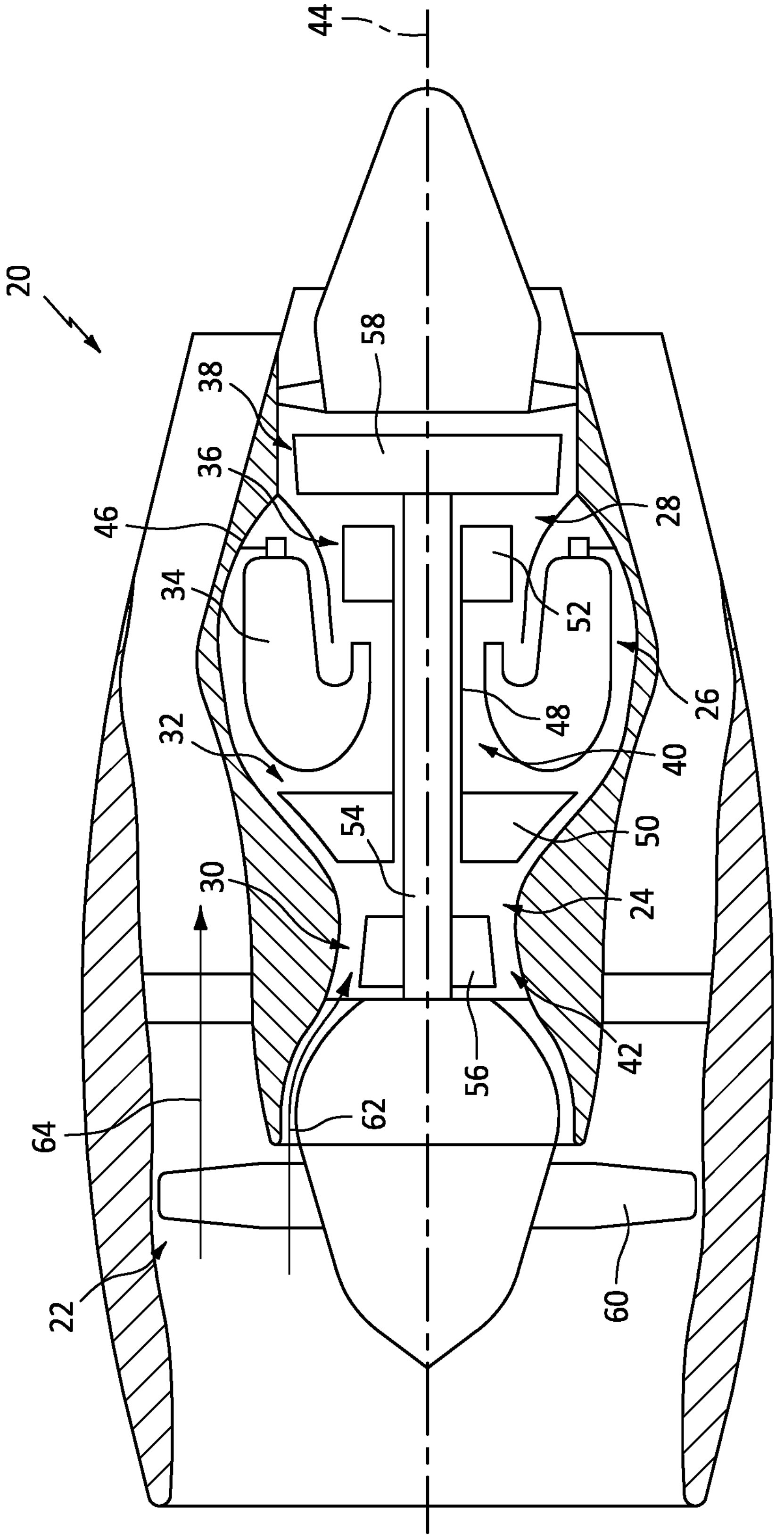
FIG. 1 schematically illustrates a cutaway, side view of a gas turbine engine for an aircraft propulsion system, in accordance with one or more embodiments of the present disclosure.

FIG. 1 schematically illustrates a gas turbine engine 20. The gas turbine engine 20 of FIG. 1 is a multi-spool turbofan gas turbine engine for an aircraft propulsion system. However, while the following description and accompanying drawings may refer to the turbofan gas turbine engine 20 of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine. Moreover, aspects of the present disclosure may also be equally applicable to engines (e.g., intermittent combustion engines), propulsion systems, and equipment other than gas turbine engines for aircraft propulsion systems.

The gas turbine engine 20 of FIG. 1 includes a fan section 22, a compressor section 24, a combustor section 26, and a turbine section 28. For example, the compressor section 24 of FIG. 1 includes a low-pressure compressor (LPC) 30 and a high-pressure compressor (HPC) 32, the combustor section 16 includes a combustor 34 (e.g., an annular combustor) forming a combustion chamber, and the turbine section 28 includes a high-pressure turbine (HPT) 36 and a low-pressure turbine (LPT) 38.

The gas turbine engine 20 sections 22, 24, 28 form a first rotational assembly 40 (e.g., a high-pressure spool) and a second rotational assembly 42 (e.g., a low-pressure spool) of the gas turbine engine 20. The first rotational assembly 40 and the second rotational assembly 42 are mounted for rotation about a rotational axis 44 (e.g., an axial centerline of the gas turbine engine 20) relative to the engine static structure 46 of the gas turbine engine 20. The engine static structure 46 may include one or more engine cases, cowlings, bearing assemblies, and/or other non-rotating structures configured to house and/or support components of the gas turbine engine 20 sections 22, 24, 26, 28.

The first rotational assembly 40 includes a first shaft 48, a bladed first compressor rotor 50 for the high-pressure compressor 32, and a bladed first turbine rotor 52 for the high-pressure turbine 36. The first shaft 48 interconnects the bladed first compressor rotor 50 and the bladed first turbine rotor 52.

The second rotational assembly 42 includes a second shaft 54, a bladed second compressor rotor 56 for the low-pressure compressor 30, and a bladed second turbine rotor 58 for the low-pressure turbine 38. The second shaft 54 interconnects the bladed second compressor rotor 56 and the bladed second turbine rotor 58. The second shaft 54 of FIG. 1 additionally interconnects the bladed second compressor rotor 56 and the bladed second turbine rotor 58 with a bladed fan rotor 60 for the fan section 22. The second shaft 54 may alternatively be coupled to the bladed fan rotor 60 (e.g., an input shaft of the bladed fan rotor 60) by a reduction gear assembly configured to drive the bladed fan rotor 60 at a reduced rotational speed relative to the second shaft 54.

In operation of the gas turbine engine 20 of FIG. 1, ambient air is directed through the fan section 22 and into a core flow path 62 and a bypass flow path 64 by rotation of the bladed fan rotor 60. Airflow along the core flow path 62 is compressed by the low-pressure compressor 30 and the high-pressure compressor 32, mixed and burned with fuel in the combustor 34, and then directed through the high-pressure turbine 36 and the low-pressure turbine 38. The bladed first turbine rotor 52 and the bladed second turbine rotor 58 rotationally drive the first rotational assembly 40 and the second rotational assembly 42, respectively, in response to the combustion gas flow through the high-pressure turbine 36 and the low-pressure turbine 38. The first shaft 48 and the second shaft 54 are concentric and rotate about the rotational axis 44. The present disclosure, however, is not limited to concentric configurations of the first shaft 48 and the second shaft 54 and the first shaft 48 and the second shaft 54 may alternatively be configured for rotation about discrete rotational axes.

Figure 2:
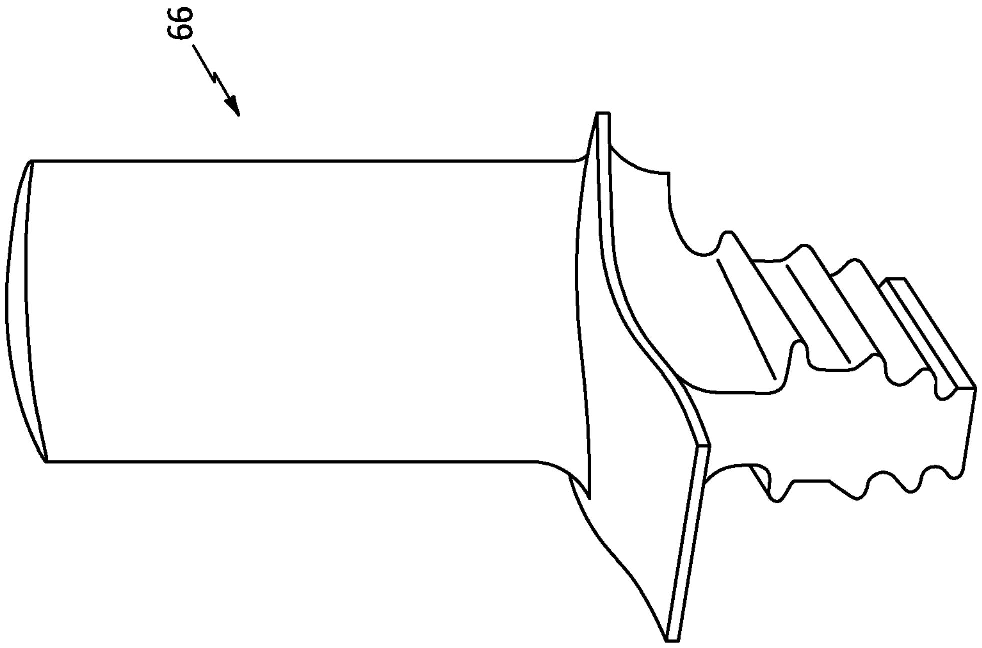
FIG. 2 illustrates a rotor blade for the gas turbine engine of FIG. 1, in accordance with one or more embodiments of the present disclosure.

Aircraft propulsion systems and other rotational equipment (e.g., the gas turbine engine 20) may include components which may be subject to non-destructive testing (NDT), for example, following manufacture or as part of a periodic inspection process, to identify cracks, fractures, laps, seems, and other defects of components (hereinafter a "defect" or "defects"). Non-destructive testing processes may be used to inspect and evaluate components without negatively impacting their material characteristics and useability. Components subject to non-destructive testing may be manufactured through common manufacturing processes such as, but not limited to welding, casting, forging, machining, additive manufacturing, or the like. These components may be formed entirely or in substantial part by non-porous materials such as metals and metal alloys. For example, components subject to non-destructive testing may include metal alloy rotor blades (e.g., airfoils; for the bladed rotors 50, 52, 56, 58, 60), stator vanes, metal alloy gearbox and bearing housings, shafts, rotor disks, engine casings, combustor heat shields, and the like. FIG. 2 illustrates a perspective view of a rotor blade 66 which may be subject to post-manufacturing and/or period non-destructive testing. However, aspects of the present disclosure are not limited to metal or metal alloy components, and non-destructive testing processes may also be used for other non-porous components and component materials such as, but not limited to, composite aerostructures, ceramic matrix composite (CMC) components, and the like.

Figure 3:
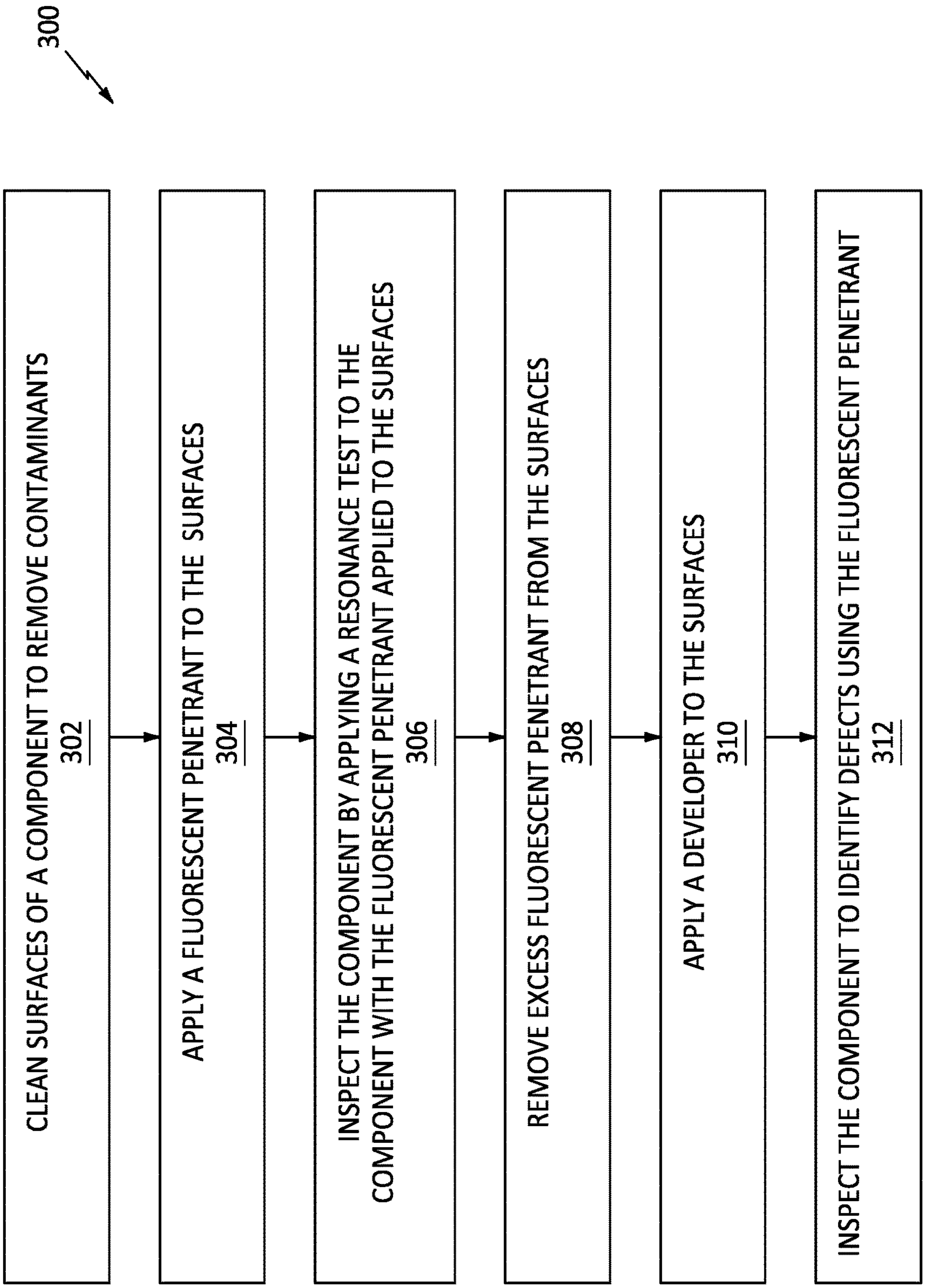
FIG. 3 illustrates a block diagram depicting a method for inspecting a component using non-destructive testing (NDT), in accordance with one or more embodiments of the present disclosure.
Figure 5:
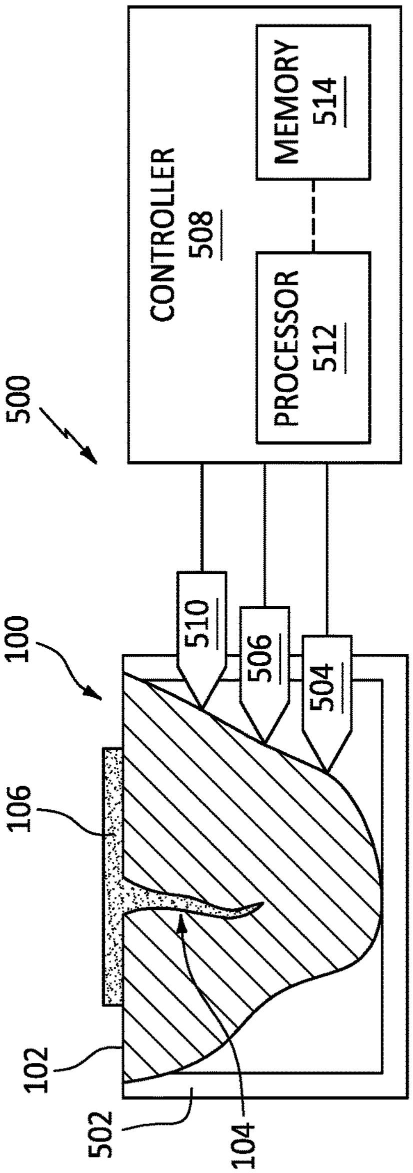
FIG. 5 illustrates a cutaway view of the component at another stage of the method of FIG. 3, in accordance with one or more embodiments of the present disclosure.
Figure 4:
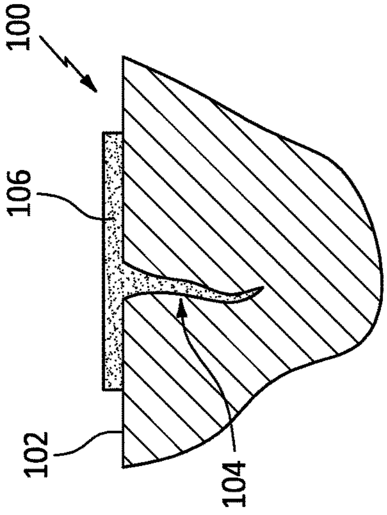
FIG. 4 illustrates a cutaway view of a component at a stage of the method of FIG. 3, in accordance with one or more embodiments of the present disclosure.
Figure 6:
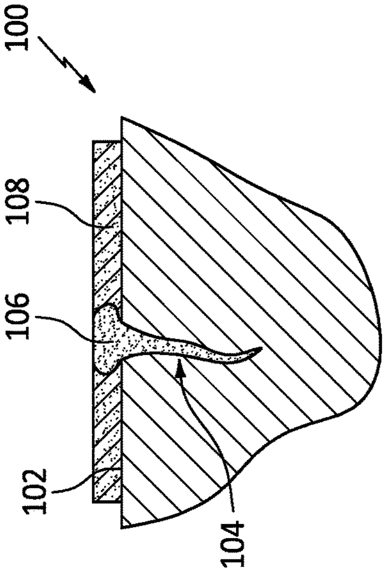
FIG. 6 illustrates a cutaway view of the component at another stage of the method of FIG. 3, in accordance with one or more embodiments of the present disclosure.

Referring to FIG. 3, a method 300 for inspecting a component using non-destructive testing (NDT), including a resonance test and a fluorescent penetration inspection (FPI) test, is provided. FIG. 3 illustrates a flowchart for the Method 300. For example, the method 300 is described herein for a component 100, as shown in FIGS. 4-6. The component 100 has one or more surfaces 102. The component 100 of FIGS. 4-6 is illustrated with a defect 104 (e.g., a crack) disposed at (e.g., on, adjacent, or proximate) one of the surfaces 102. The size of the defect 104 relative to the component 100 is exaggerated in FIGS. 4-6 for clarity. Unless otherwise noted herein, it should be understood that the steps of method 300 are not required to be performed in the specific sequence in which they are discussed below and, in some embodiments, the steps of the method 400 may be performed separately or simultaneously. While the present disclosure method 300 is described for a fluorescent penetrant, aspects of the present disclosure may be equally applicable to visual inspections using other indicator penetrants (e.g., red-dye penetrants).

Step 302 includes, optionally, cleaning one or more of the surfaces 102 to remove all or a substantial portion of contaminants which may be disposed on the surfaces 102. Examples of contaminants include paint, oil, dirt, debris, rust, scale, or the like which may obstruct (e.g., fill) a defect (e.g., the defect 104) of the component 100 at (e.g., on, adjacent, or proximate) the surfaces 102. Cleaning the surfaces 102 may simply include wiping the surfaces 102 with a damp cloth, spraying the surfaces 102 with water, and/or grinding or brushing the surfaces 102. Additionally or alternatively, solvents or reactive agents may be applied to the surfaces 102 to remove contaminants.

Step 304 includes applying a fluorescent penetrant 106 to one or more of the surfaces 102. For example, FIG. 4 illustrates the penetrant applied to one or more of the surfaces 102. The fluorescent penetrant 106 includes one or more fluorescent dyes configured to fluoresce when exposed to ultraviolet (UV) light. Examples of the fluorescent penetrant 106 may be found, for example, in Aerospace Material Specification 2644 ("AMS2644"), SAE International (Rev. H, July 2020), the disclosure of which is hereby incorporated herein by reference in its entirety, and examples of the fluorescent penetrant 106 may include, but are not limited to, water-washable fluorescent penetrants, water-washable and water-containing fluorescent penetrants, post-emulsifiable and lipophilic fluorescent penetrants, solvent removable fluorescent penetrants, and post-emulsifiable and hydrophilic fluorescent penetrants. The fluorescent penetrant 106 may be applied to the surface 102, for example, by spray or brushing the fluorescent penetrant 106 onto the surfaces 102, or by dipping the component 100 (e.g., the surfaces 102) into the fluorescent penetrant 106. Once applied to the surfaces 102, the fluorescent penetrant 106 is allowed time to be sufficiently drawn into any defects (e.g., the defect 104) of the component 100, for example, by capillary action. This period of time may be referred to as a "dwell time." The dwell time for the fluorescent penetrant 106 may vary based on the material of the component 100, the sizes of any defects on the component 100, and the viscosity of the fluorescent penetrant 106. For smaller defects, the dwell time for the fluorescent penetrant 106 may be longer than for larger defects as the fluorescent penetrant 106 may require more time to be fully drawn into the smaller defects. For a component 100 which may be exposed to extreme conditions during operation, such as, but not limited to, the rotor blade 66 of FIG. 2 or other aircraft propulsion system components, the required dwell time for the component 100 may be significant as inspection of the component 100 may require identification of very small defects.

Step 306 includes inspecting the component 100 using a resonance test while the fluorescent penetrant 106 is applied to the component 100 (e.g., to the surfaces 102). In particular, the resonance test is applied to the component 100 during the dwell time for the fluorescent penetrant 106. Step 306 includes resonating the component 100 by vibrating the component 100 at its resonant frequency. Once the component 100 is vibrating at its resonant frequency, the resonant frequency for the component 100 may be measured and compared to a predetermined resonant frequency threshold range for the component 100. A measured resonant frequency for the component 100 which is outside of the resonant frequency threshold range for the component 100 may indicate that the component 100 has or is likely to have one or more defects rendering the component 100 unsuitable for operational use. These defects may include internal defects of the component 100 cannot be identified or are difficult to identify by observing visible surfaces (e.g., the surfaces 102) of the component 100. The resonance test applied to the component 100 may include resonant ultrasound spectroscopy (RUS) testing, process compensated resonance testing (PCRT), or another suitable resonance inspection technique for non-destructive testing conventionally known in the art.

By vibrating the component 100 at its resonant frequency, the capillary action which draws the fluorescent penetrant 106 into defects (e.g., the defect 104) of the component 100 is enhanced. By performing resonance testing on the component 100 while the fluorescent penetrant 106 is applied to the component 100, the required dwell time for the fluorescent penetrant 106 may be significantly reduced relative to a conventional dwell time period for a static component.

Accordingly, the present disclosure method facilitates a reduction in fluorescent penetrant 106 dwell time as well as an efficient combination of steps of two different non-destructive testing (NDT) processes, thereby reducing total inspection time for the component 100. Moreover, the fluorescent penetrant 106 is more effectively drawn into defects (e.g., the defect 104) at the surfaces 102 of the component 100, thereby improving the performance of a subsequent fluorescent penetrant inspection (FPI) test for the component 100, and particularly for the identification of small defects during the FPI test.

FIG. 5 schematically illustrates an exemplary resonance test assembly 500 for applying a resonance test inspection to the component 100. The resonance test assembly 500 of FIG. 5 includes a nest 502, one or more input transducers 504, one or more output transducers 506, and a controller 508. The resonance test assembly 500 may also include a temperature sensor 510. The present disclosure, however, is not limited to the particular configuration of the resonance test assembly 500 of FIG. 5. The nest 502 is a support fixture for the component 100. The nest 502 is an interface between the component 100 and the transducers 504, 506 to locate the component 100 relative to the transducers 504, 506 to facilitate vibration response and vibration measurement of the component 100. The input transducers 504 and the output transducers 506 are installed on the nest 502 and disposed at (e.g., on, adjacent, or proximate) the component 100. The input transducers 504 (e.g., piezoelectric transducers) are configured to apply vibration to the component 100 along a range of frequencies to effect resonance of the component 100. The output transducers 506 (e.g., piezoelectric transducers) are configured to measure a vibration frequency of the component 100.

The controller 508 is in communication with the input transducers 504, the output transducers 506, and/or the temperature sensor 510 to control and/or receive signals therefrom to perform the functions described herein. The controller 508 includes a processor 512 connected in signal communication with memory 514. The processor 512 may include any type of computing device, computational circuit, processor(s), CPU, computer, or the like capable of executing a series of instructions that are stored in memory 514. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the resonance test assembly 500 to accomplish the same algorithmically and/or coordination of device components. The memory 514 may include a single memory device or a plurality of memory devices (e.g., a computer-readable storage device that can be read, written, or otherwise accessed by a general purpose or special purpose computing device, including any processing electronics and/or processing circuitry capable of executing instructions). The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 508. The controller 508 may include, or may be in communication with, an input device that enables a user to enter data and/or instructions, and may include, or be in communication with, an output device configured, for example to display information (e.g., a visual display or a printer), or to transfer data, etc. A person of skill in the art will recognize that portions of the controller may assume various forms (e.g., digital signal processor, analog device, etc.) capable of performing the functions described herein. For example, the controller 508 may include or otherwise operate as a transceiver to control a vibration frequency of the input transducers 504 and to measure a vibration frequency of the output transducers 506.

The resonance test assembly 500 may further include the temperature sensor 510 to measure a temperature of the component 100. The temperature sensor 510 may be installed on the nest 502 and disposed at (e.g., on, adjacent, or proximate) the component 100. Because the resonance frequency of the component 100 may be affected by variations in the component temperature 100, the temperature sensor 510 may measure the temperature of the component 100, thereby allowing the controller 508 to compensate for the component 100 temperature when measuring the vibration frequency (e.g., the resonance frequency) of the component 100.

Step 306 may include installing the component 100 into the nest 502 with the fluorescent penetrant 106 disposed on the component 100 (e.g., the surfaces 102; see step 304). Alternatively, the fluorescent penetrant 106 may be applied to the surfaces 102 with the component 100 installed in the nest 502. With the fluorescent penetrant 106 disposed on the component 100, step 306 may include applying a vibration to the component 100 with the input transducers 504. The controller 508 may vary (e.g., increase or decrease) a vibration frequency applied by the input transducers 504 until the controller 508 identifies resonance of the component 100 using vibration measurements from the output transducers 506. Once the controller 508 identifies resonance of the component 100, the controller 508 may measure and record the resonance frequency of the component 100. The controller 508 may maintain the vibration frequency applied by the input transducers 504 to the component 100 to continue to resonate the component 100 for a predetermined period of time to facilitate soaking of the fluorescent penetrant 106 into any defects of the component 100 along the surfaces 102. The controller 508 may compare the measured resonance frequency of the component 100 to the predetermined resonant frequency threshold range for the component 100 to determine the component 100 has passed or failed the resonance test. For example, the controller 508 may determine the component 100 has passed the resonance test where the measured resonance frequency is within the resonant frequency threshold range for the component 100 and the controller 508 may determine the component 100 has failed the resonance test where the measured resonance frequency is outside of the resonant frequency threshold range for the component 100. In embodiments of the resonance test assembly 500 including the temperature sensor 510, for example, the controller 508 may apply a temperature correction factor to the measured resonance frequency, based on the measured temperature of the component 100, to correct the measured resonance frequency to a baseline component temperature associated with the resonant frequency threshold range for the component 100.

Step 308 includes removing excess fluorescent penetrant 106 from the surfaces 102, subsequent to resonating the component 100 during the resonance test of step 306. removing excess fluorescent penetrant 106 includes removing the fluorescent penetrant 106 from the surfaces 102 without removing the fluorescent penetrant 106 from any defects of the component 100 along the surfaces 102. The component 100 may be removed from the nest 502 and excess fluorescent penetrant 106 may be washed away from the surfaces 102 with water. In some embodiments, step 308 may include immersing the component in an emulsifier or otherwise applying the emulsifier to the surfaces 102 to facilitate removal of the excess fluorescent penetrant 106 from the surfaces 102. Subsequent to application of the emulsifier, the excess fluorescent penetrant 106 and the emulsifier may be washed away from the surfaces 102 with water.

Step 310 includes applying a developer 108 to the surfaces 102, subsequent to removing the excess fluorescent penetrant 106 from the surfaces 102 as shown, for example, in FIG. 6. Examples of the developer 108 may be found, for example, in AMS2644, and examples of the developer 108 may include, but are not limited to, dry powder developers, water soluble developers, water suspendable developers, nonaqueous type 1 fluorescent (solvent based) developers, and nonaqueous type 2 visible dye (solvent based) developers. Step 310 may include drying the component 100 prior to application of the developer 108 to the surfaces 102. The developer 108 may facilitate increased contrast between the fluorescent penetrant 106 and the component 100 material at the surfaces 102. The developer 108 may additionally pull at least a portion of the fluorescent penetrant 106 from any defects (e.g., the defect 104) toward and/or onto the surfaces 102, thereby facilitating greater visibility of the fluorescent penetrant 106 and associated defects.

Step 312 includes inspecting the component 100, subsequent to application of the developer 108, to identify the presence or absence of a defect at the surfaces 102. For example, an inspector may apply (e.g., direct) ultraviolet (UV) light onto the component 100 to cause the fluorescent penetrant 106 to fluoresce at (e.g., on, adjacent, or proximate) the location of one or more defects of the component 100 on the surfaces 102 (e.g., the defect 104). Subsequent to inspection of the component 100, the component 100 may be cleaned to remove any remaining fluorescent penetrant 106 and/or developer 108 from the component 100.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A method for inspecting an aircraft propulsion system component for defects using non-destructive testing, the method comprising:

applying a fluorescent penetrant to one or more surfaces of a component;

installing the component in a nest of a resonance test assembly prior to or subsequent to applying the fluorescent penetrant to the one or more surfaces, the resonance test assembly further including one or more input transducers and one or more output transducers;

resonating the component with the resonance test assembly, while the fluorescent penetrant is applied to the one or more surfaces, and measuring a resonance frequency of the component with the resonance test assembly, resonating the component with the resonance test assembly including applying a vibration to the component using the one or more input transducers with the component disposed in the nest, measuring the resonance frequency of the component including measuring the resonance frequency of the component using the one or more output transducers with the component disposed in the nest;

removing excess fluorescent penetrant from the one or more surfaces subsequent to measuring the resonance frequency of the component; and inspecting the component by illuminating the component with ultraviolet (UV) light and, while illuminating the component, identifying a presence or an absence of one or more defects at the one or more surfaces indicated by the fluorescent penetrant.

2. The method of claim 1, further comprising comparing the resonance frequency to a resonant frequency threshold range for the component to identify the component has passed or failed a resonance test.

3. The method of claim 1, further comprising cleaning the one or more surfaces prior to applying the fluorescent penetrant to the one or more surfaces.

4. The method of claim 1, wherein removing the excess fluorescent penetrant from the one or more surfaces includes applying an emulsifier to the one or more surfaces.

5. The method of claim 1, wherein measuring the resonance frequency of the component with the resonance test assembly includes measuring a temperature of the component and measuring the resonance frequency of the component using the measured temperature.

6. The method of claim 1, further comprising applying a developer to the one or more surfaces subsequent to removing excess fluorescent penetrant and prior to identifying the presence or the absence of the one or more defects.

7. A method for inspecting an aircraft propulsion system component for defects using non-destructive testing, the method comprising:

applying a fluorescent penetrant to one or more surfaces of a component;

installing the component, with the fluorescent penetrant applied to the one or more surfaces, into a nest of a resonance test assembly;

resonating the component in the nest with one or more input transducers of the resonance test assembly, while the fluorescent penetrant is applied to the one or more surfaces, and measuring a resonance frequency of the component with one or more output transducers of the resonance test assembly, measuring the resonance frequency of the component with the resonance test assembly including measuring a temperature of the component and measuring the resonance frequency of the component using the measured temperature;

removing excess fluorescent penetrant from the one or more surfaces; and inspecting the component by illuminating the component with ultraviolet (UV) light and, while illuminating the component, identifying a presence or an absence of one or more defects at the one or more surfaces indicated by the fluorescent penetrant.

8. The method of claim 7, further comprising comparing the resonance frequency to a resonant frequency threshold range for the component to identify the component has passed or failed a resonance test.

9. The method of claim 7, further comprising cleaning the one or more surfaces prior to applying the fluorescent penetrant to the one or more surfaces.

10. The method of claim 7, wherein removing the excess fluorescent penetrant from the one or more surfaces includes applying an emulsifier to the one or more surfaces.

11. The method of claim 7, wherein the one or more defects include a crack, a fracture, a lap, or a seem of a component material of the component at the one or more surfaces.

12. A method for inspecting an aircraft propulsion system component for defects using non-destructive testing, the method comprising:

applying a penetrant to one or more surfaces of a component;

installing the component in a nest of a resonance test assembly prior to or subsequent to applying the fluorescent penetrant to the one or more surfaces, the resonance test assembly further including one or more input transducers and one or more output transducers;

resonating the component with a the resonance test assembly, while the penetrant is applied to the one or more surfaces, measuring a resonance frequency of the component with the resonance test assembly, and comparing the resonance frequency to a resonant frequency threshold range for the component to identify the component has passed or failed a resonance test, resonating the component with the resonance test assembly including applying a vibration to the component using the one or more input transducers with the component disposed in the nest, measuring the resonance frequency of the component including measuring the resonance frequency of the component using the one or more output transducers with the component disposed in the nest;

removing excess penetrant from the one or more surfaces subsequent to measuring the resonance frequency of the component;

applying a developer to the one or more surfaces; and inspecting the component to identify a presence or an absence of one or more defects at the one or more surfaces indicated by the penetrant.

13. The method of claim 1, wherein removing the excess penetrant from the one or more surfaces includes applying an emulsifier to the one or more surfaces.

* * * * *